United States Patent
Wasselin

(10) Patent No.: US 12,253,030 B2
(45) Date of Patent: Mar. 18, 2025

(54) IN-FLIGHT ENGINE RE-START

(71) Applicant: RTX Corporation, Farmington, CT (US)

(72) Inventor: David Wasselin, Farmington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/856,550

(22) Filed: Jul. 1, 2022

(65) Prior Publication Data
US 2024/0003300 A1   Jan. 4, 2024

(51) Int. Cl.
| | |
|---|---|
| *F02C 7/262* | (2006.01) |
| *B64D 31/06* | (2006.01) |
| *F02C 9/00* | (2006.01) |
| *B64D 27/10* | (2006.01) |

(52) U.S. Cl.
CPC ............. *F02C 7/262* (2013.01); *B64D 31/06* (2013.01); *F02C 9/00* (2013.01); *B64D 27/10* (2013.01); *F05D 2260/85* (2013.01)

(58) Field of Classification Search
USPC ............................................... 60/779, 39.091
See application file for complete search history.

(56) References Cited

U.S. PATENT DOCUMENTS

| | | | | |
|---|---|---|---|---|
| 5,123,239 A | * | 6/1992 | Rodgers | F02C 7/275 60/778 |
| 5,174,109 A | * | 12/1992 | Lampe | F02C 7/275 60/788 |
| 5,379,583 A | * | 1/1995 | Zickwolf, Jr. | F02C 9/20 701/100 |
| 6,836,086 B1 | * | 12/2004 | Goldberg | F02C 7/26 318/140 |
| 10,106,269 B1 | * | 10/2018 | Thornton | B64D 45/00 |
| 10,676,209 B1 | * | 6/2020 | Pezalla | B64D 45/00 |
| 10,773,814 B2 | | 9/2020 | Strauss et al. | |
| 2007/0022736 A1 | * | 2/2007 | Durling | F02D 41/3041 60/39.821 |

(Continued)

FOREIGN PATENT DOCUMENTS

EP    3584168 A1 * 12/2019 ............. B64D 35/02

OTHER PUBLICATIONS

Zachos, P.K., (2010). Gas turbine sub-idle performance modelling: altitude relight and windmilling. Ph. D. Thesis. Cranfield University. pp. 26-30. (Year: 2010).*

(Continued)

*Primary Examiner* — Todd E Manahan
*Assistant Examiner* — Marc Amar
(74) *Attorney, Agent, or Firm* — CANTOR COLBURN LLP

(57) ABSTRACT

Examples described herein provide a method for restarting an engine of an aircraft during a flight of the aircraft. The method includes detecting a shutdown of the engine. The method further includes setting a flag to prevent a quick-relight situation. The method further includes performing an auto-relight procedure to attempt to restart the engine. The method further includes, responsive to determining that the auto-relight procedure failed to restart the engine, selectively performing at least one of a windmilling restart of the engine or a starter assist restart of the engine.

20 Claims, 5 Drawing Sheets

(56) References Cited

U.S. PATENT DOCUMENTS

| | | | | |
|---|---|---|---|---|
| 2007/0132245 | A1* | 6/2007 | Duesterhoeft | F02N 11/04 290/27 |
| 2008/0141651 | A1* | 6/2008 | Eason | F02K 3/10 60/39.821 |
| 2016/0252019 | A1* | 9/2016 | Joshi | F02C 9/20 60/776 |
| 2016/0281611 | A1* | 9/2016 | Stockwell | F02C 9/54 |
| 2018/0201386 | A1* | 7/2018 | Strauss | B64C 27/12 |
| 2018/0354632 | A1* | 12/2018 | Hon | B64D 27/24 |
| 2021/0115857 | A1 | 4/2021 | Collopy | |
| 2021/0317790 | A1* | 10/2021 | Ziolkowski | F02C 9/28 |
| 2022/0063826 | A1* | 3/2022 | Hiett | F02C 7/262 |
| 2022/0220900 | A1* | 7/2022 | Karnofski | F02C 9/28 |

OTHER PUBLICATIONS

Jagadish Babu, C., Samuel, M.P., Davis, A. (2020). In-Depth Analysis of the Starting Process of Gas Turbine Engines. Proceedings of the National Aerospace Propulsion Conference . Lecture Notes in Mechanical Engineering. Springer, Singapore. pp. 226. https://rdcu.be/deZt5226 (Year: 2020).*

Bhatt, A., Balaji, B., Tyeb, A., Gupta, A., Padwale, M.P. and Ravishankar, G.P., Dec. 2017. Suction Mode Start Characteristics of a Turbofan Engine for a Windmill Relight. In Gas Turbine India Conference (vol. 58509, p. V001T04A016). American Society of Mechanical Engineers. (Year: 2007).*

Certification Authorities for Large Transport Aircraft (CATA), "CATA Worklist Item TCCA-002—In-Flight All-Engines-Out Restart Guidance", US Federal Aviation Administration, Rev. Nov. 31, 2020, p. 7, (Year: 2020) downloaded on Nov. 26, 2023 from URL: https://www.faa.gov/sites/faa.gov/files/aircraft/air_cert/design_approvals/transport/TCCA-002_in-flight_all_engines_out_restart_guidance.pdf (Year: 2002).*

General Aviation Joint Steering Committee, Full Authority Digital Engine Control (FADEC), 2024, Federal Aviation Administration (FAA), AFS-920 17-12, p. 2. Downloaded on Oct. 4, 2024 from https://www.faa.gov/sites/faa.gov/files/2022-01/Full%20Authority%20Digital%20Engine%20Control%20(FADEC).pdf (Year: 2024).*

FAA, FADEC (Full Authority Digital Engine Control) (SCF-SE-48) Notes 2017/5-1-106 (I) PP, Mar. 29, 2017, p. 5. downloaded on Oct. 4, 2024 from https://www.faa.gov/sites/faa.gov/files/2022-01/Full%20Authority%20Digital%20Engine%20Control%20(FADEC).pdf (Year: 2017).*

* cited by examiner

IN-FLIGHT ENGINE RE-START

BACKGROUND

The subject matter disclosed herein generally relates to in-flight engine re-start of an aircraft engine.

During operation on an aircraft, an engine may shutdown, such as because of a failure, emergency, manual shutdown, and/or the like. After an engine shutdown during flight, may be desirable to re-start the shutdown engine. Techniques for restarting a shutdown engine include auto-relight, auto-start (which may use windmilling and/or starter assist), and quick relight.

BRIEF DESCRIPTION

In one exemplary embodiment, a method for restarting an engine of an aircraft during a flight of the aircraft is provided. The method includes detecting a shutdown of the engine. The method further includes setting a flag to prevent a quick-relight situation. The method further includes performing an auto-relight procedure to attempt to restart the engine. The method further includes, responsive to determining that the auto-relight procedure failed to restart the engine, selectively performing at least one of a windmilling restart of the engine or a starter assist restart of the engine.

In addition to one or more of the features described herein, or as an alternative, further embodiments of the method may include, responsive to the windmilling restart failing to restart the engine, performing the starter assist restart of the engine.

In addition to one or more of the features described herein, or as an alternative, further embodiments of the method may include that performing the starter assist restart of the engine includes starting an auxiliary power unit and enabling bleed air from the auxiliary power unit to the engine.

In addition to one or more of the features described herein, or as an alternative, further embodiments of the method may include, responsive to successfully restarting the engine using the auto-relight procedure, resetting the flag.

In addition to one or more of the features described herein, or as an alternative, further embodiments of the method may include, responsive to successfully restarting the engine using the windmilling restart, resetting the flag.

In addition to one or more of the features described herein, or as an alternative, further embodiments of the method may include, responsive to successfully restarting the engine using the starter assist restart, resetting the flag.

In addition to one or more of the features described herein, or as an alternative, further embodiments of the method may include that selectively performing the at least one of the windmilling restart of the engine or the starter assist restart of the engine is based on a flight envelope of the aircraft.

In addition to one or more of the features described herein, or as an alternative, further embodiments of the method may include that the engine is a gas turbine engine.

In another exemplary embodiment a controller includes a memory including computer readable instructions and a processing device for executing the computer readable instructions. The computer readable instructions control the processing device to perform operations for restarting an engine of an aircraft during a flight of the aircraft. The operations include detecting a shutdown of the engine. The operations further include setting a flag to prevent a quick-relight situation. The operations further include performing an auto-relight procedure to attempt to restart the engine. The operations further include, responsive to determining that the auto-relight procedure failed to restart the engine, selectively performing at least one of a windmilling restart of the engine or a starter assist restart of the engine.

In addition to one or more of the features described herein, or as an alternative, further embodiments of the controller may include that the operations further include, responsive to the windmilling restart failing to restart the engine, performing the starter assist restart of the engine.

In addition to one or more of the features described herein, or as an alternative, further embodiments of the controller may include that performing the starter assist restart of the engine includes starting an auxiliary power unit and enabling bleed air from the auxiliary power unit to the engine.

In addition to one or more of the features described herein, or as an alternative, further embodiments of the controller may include that the operations further include, responsive to successfully restarting the engine using the auto-relight procedure, resetting the flag.

In addition to one or more of the features described herein, or as an alternative, further embodiments of the controller may include that the operations further include, responsive to successfully restarting the engine using the windmilling restart, resetting the flag.

In addition to one or more of the features described herein, or as an alternative, further embodiments of the controller may include that the operations further include, responsive to successfully restarting the engine using the starter assist restart, resetting the flag.

In addition to one or more of the features described herein, or as an alternative, further embodiments of the controller may include that selectively performing the at least one of the windmilling restart of the engine or the starter assist restart of the engine is based on a flight envelope of the aircraft.

In addition to one or more of the features described herein, or as an alternative, further embodiments of the controller may include that the engine is a gas turbine engine.

In yet another exemplary embodiment a computer program product includes a computer readable storage medium having program instructions embodied therewith, wherein the computer readable storage medium is not a transitory signal per se, the program instructions executable by a processing device to cause the processing device to perform operations for restarting an engine of an aircraft during a flight of the aircraft. The operations include detecting a shutdown of the engine. The operations further include setting a flag to prevent a quick-relight situation. The operations further include performing an auto-relight procedure to attempt to restart the engine. The operations further include, responsive to determining that the auto-relight procedure failed to restart the engine, selectively performing at least one of a windmilling restart of the engine or a starter assist restart of the engine.

In addition to one or more of the features described herein, or as an alternative, further embodiments of the computer program product may include that the operations further include, responsive to the windmilling restart failing to restart the engine, performing the starter assist restart of the engine.

In addition to one or more of the features described herein, or as an alternative, further embodiments of the computer program product may include that performing the starter assist restart of the engine includes starting an auxiliary power unit and enabling bleed air from the auxiliary power unit to the engine.

In addition to one or more of the features described herein, or as an alternative, further embodiments of the computer program product may include that the operations further include, responsive to successfully restarting the engine using the auto-relight procedure, resetting the flag.

The above features and advantages, and other features and advantages, of the disclosure are readily apparent from the following detailed description when taken in connection with the accompanying drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
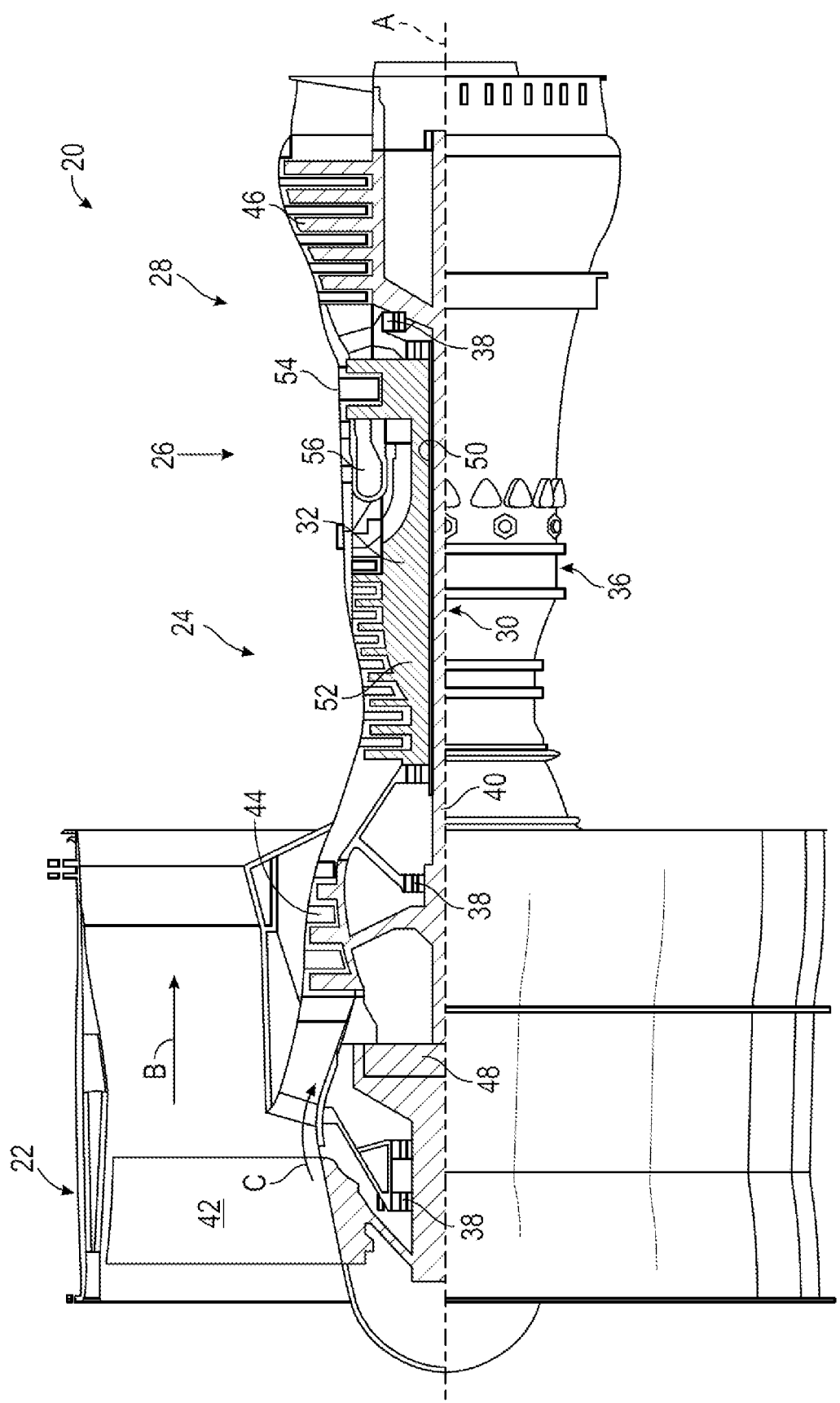
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. In some embodiments, stator vanes 45 in the low pressure compressor 44 and stator vanes 55 in the high pressure compressor 52 may be adjustable during operation of the gas turbine engine 20 to support various operating conditions. In other embodiments, the stator vanes 45, 55 may be held in a fixed position. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
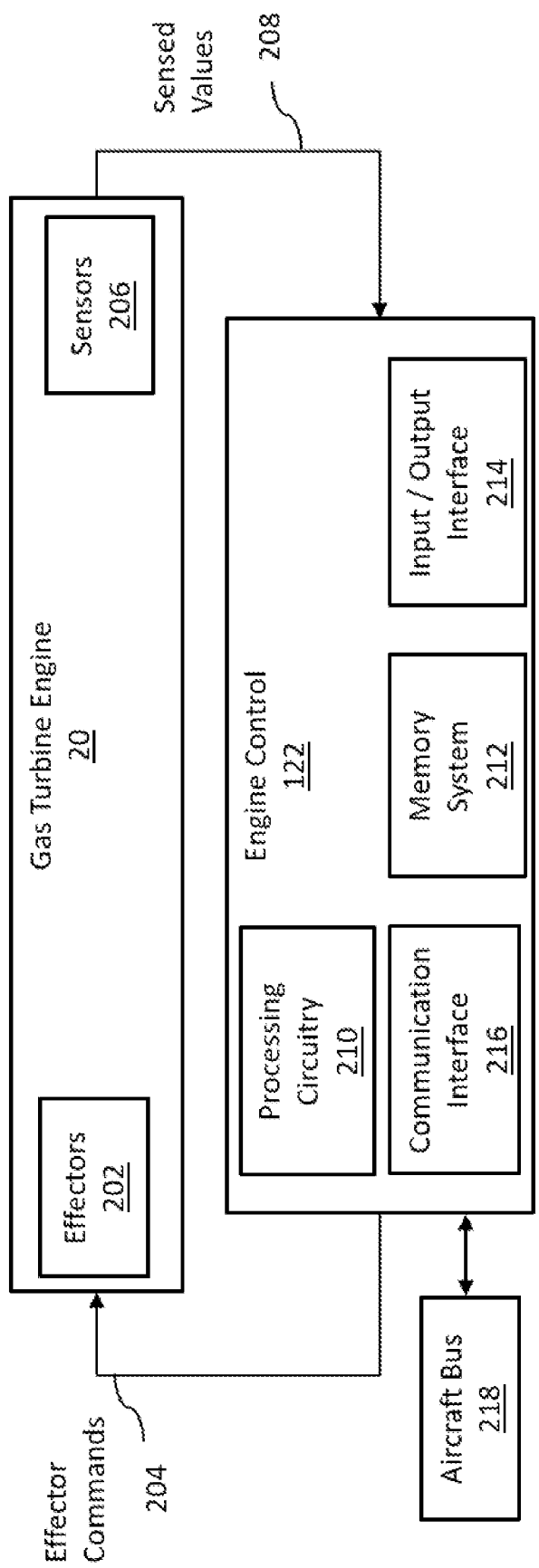
FIG. 2 depicts an example of an engine control configured to monitor and control operation of a gas turbine engine in real-time (or near-real time) according to one or more embodiments described herein.

FIG. 2 depicts an example of an engine control 122 configured to monitor and control operation of a gas turbine engine (e.g., the gas turbine engine 20) in real-time (or near-real time) according to one or more embodiments described herein. The engine control 122 can control effectors 202 of the gas turbine engine 20 by generating one or more effector commands 204. Examples of effectors 202 can include one or more motors, solenoids, valves, relays, pumps, heaters, and/or other such actuation control components. A plurality of sensors 206 can capture state data associated with the gas turbine engine 20 and provide sensed values 208 as feedback to the engine control 122 to enable closed-loop control of the gas turbine engine 20 according to one or more control laws. Examples of the sensors 206 can include one or more temperature sensors, pressure sensors, strain gauges, speed sensors, accelerometers, lube sensors, and the like.

The engine control 122 (also referred to as a "controller") can be a full authority digital engine control (FADEC) that includes processing circuitry 210 (also referred to as a "processing device") and a memory system 212 (also referred to as a "memory") configured to store a plurality of configuration items, where at least one of the configuration items includes a sequence of the computer executable instructions for execution by the processing circuitry 210. Other types of configuration items can include data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 20. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements. The input/output interface 214 can include support circuitry for interfacing with the effectors 202 and sensors 206, such as filters, amplifiers, digital-to-analog converters, analog-to-digital converters, and other such circuits to support digital and/or analog interfaces. Further, the input/output interface 214 can receive or output signals to/from other sources, such as discrete inputs/outputs and/or status signals. The communication interface 216 may communicate with an aircraft bus 218 of an aircraft. The aircraft bus 218 can provide aircraft-level parameters and commands that are used by the engine control 122 to control the gas turbine engine 20 in real-time. The communication interface 216 may also support communication with other components, such as other instances of the engine control 122, storage units, diagnostic units, communication adapters, off-board systems, and the like.

Conventionally, the following functions may be applied, such as by the engine control 122, to restart an engine when an engine fails in flight: auto-relight, auto-start, and quick-relight. Auto-relight is an automatic function that schedules an "igniter ON" condition when the shutdown engine N2DOT is indicating a loss of energy. Auto-start is a procedure initiated by the pilot following standard operating procedures. Auto-start may include performing a windmilling restart (e.g., if air compressor speed is above a threshold) and/or a starter assist restart (e.g., if air compressor speed is lower than a threshold (e.g., a speed of substantially 250 knots). A quick-relight relights an engine that inadvertently shut down. For example, engine 1 is failed, pilot selects engine 2 lever which shuts down engine 2. The pilot then realizes the mistake and quickly switches engine lever back (e.g., ON-OFF-ON).

These three different functions (auto-relight, auto-start, and quick-relight) each perform the same goal: restart and/or keep the engine ON when the aircraft is in the air. However, each of the three different functions uses different fuel schedules to be analyzed and flight tested for tuning. This is time and cost intensive. Moreover, the quick-relight certification is difficult to pass because large bypass engines do not react well and may require FAA exemption, which is a time consuming and costly process.

Figure 3A:
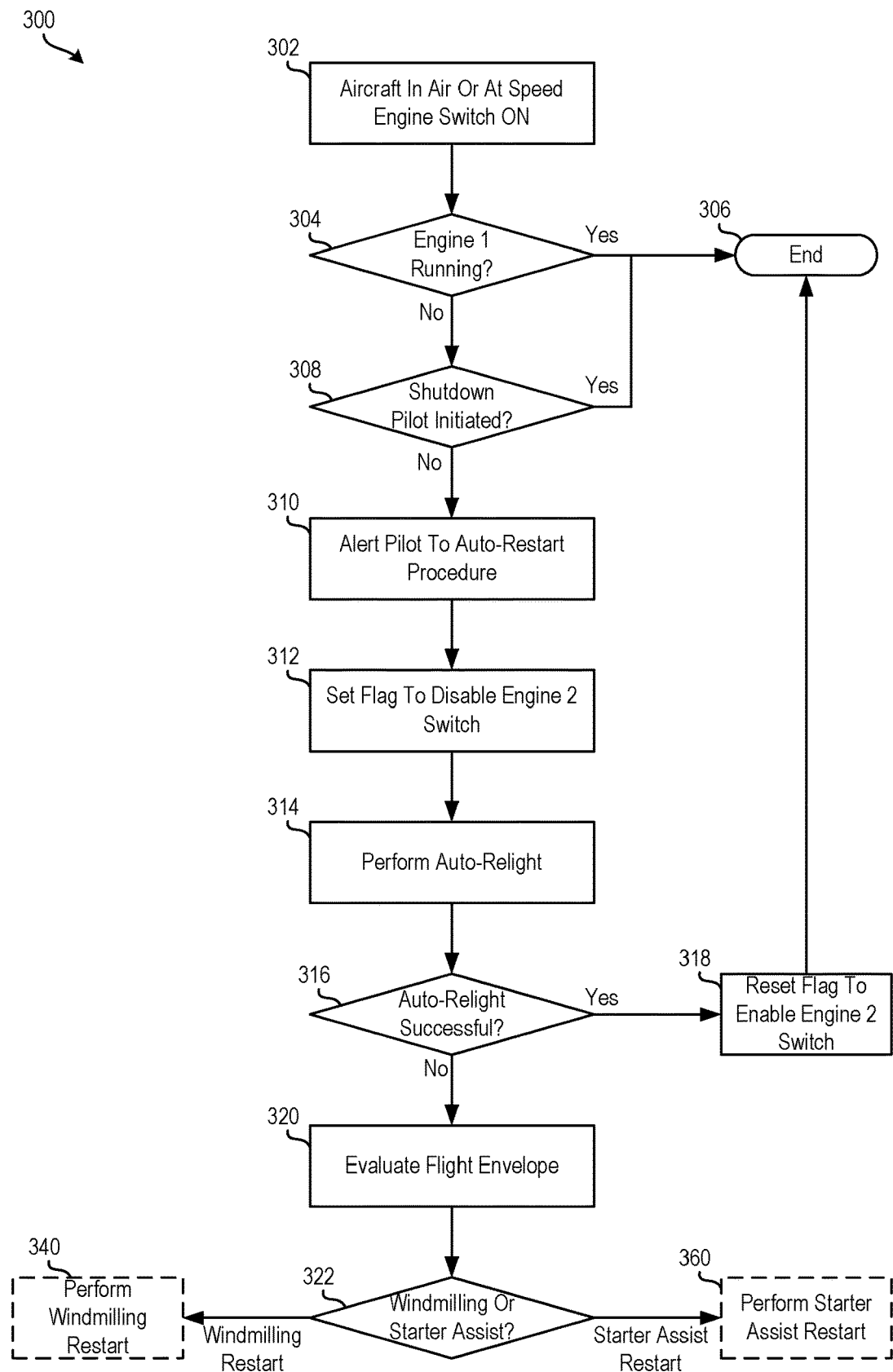
FIGS. 3A-3C are flow diagrams of a method for in-flight engine re-start of an aircraft engine according to one or more embodiments described herein.
Figure 3B:
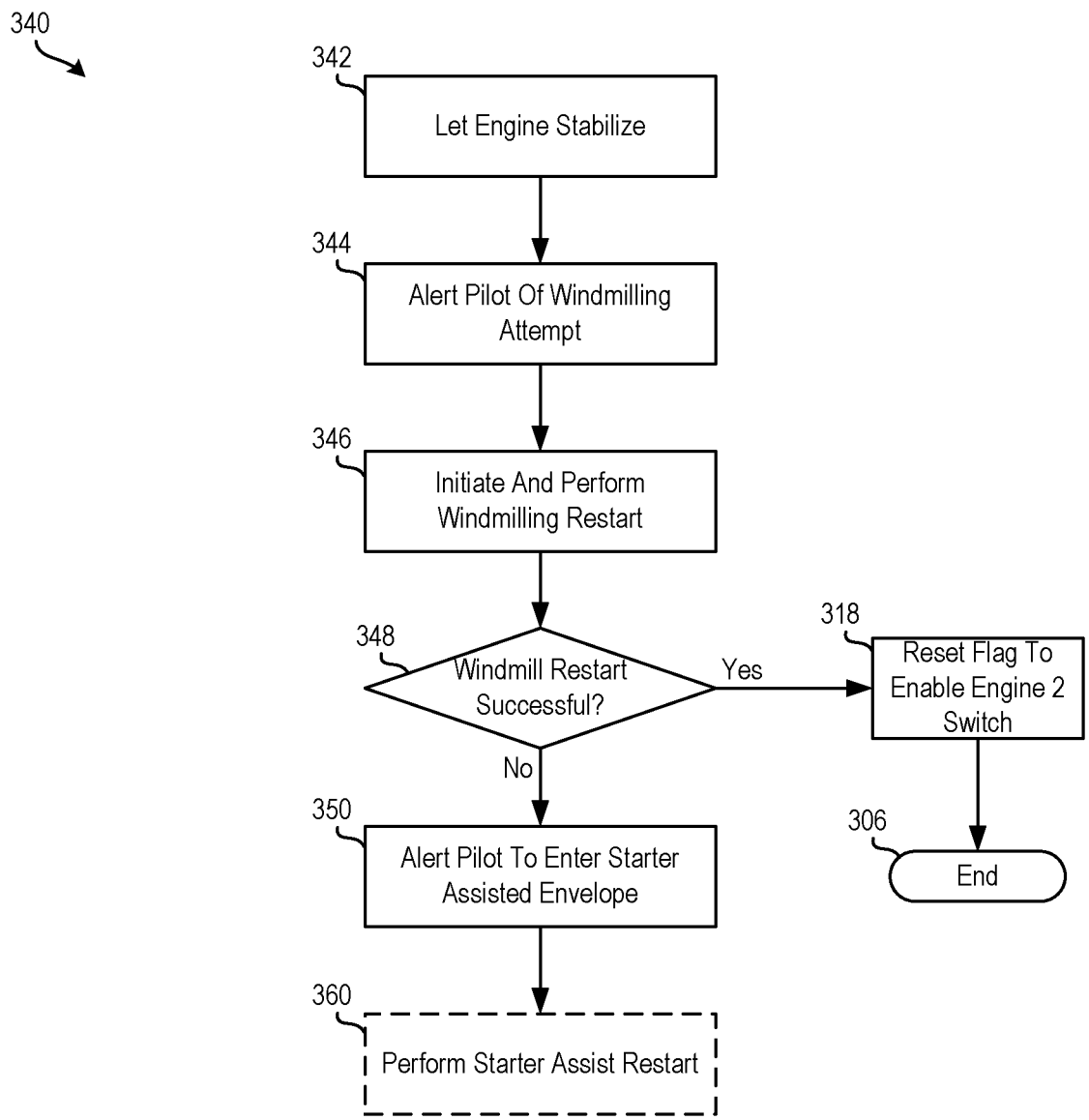
Figure 3C:
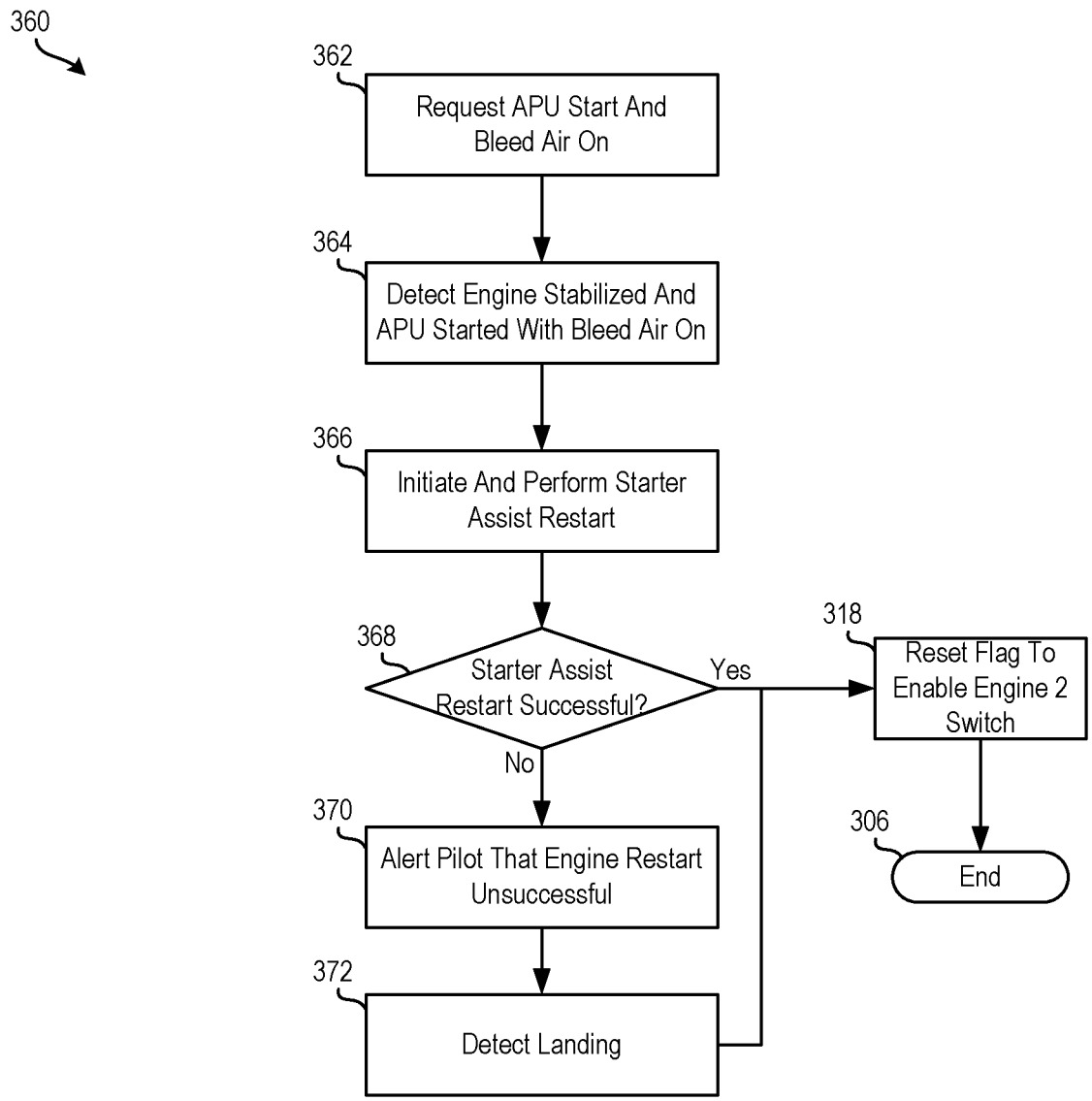

One or more embodiments described herein combine these three functions and automate in-flight engine restart to increase engine run time and reduce pilot demands FIGS. 3A-3C are flow diagrams of a method for in-flight engine re-start of an aircraft engine according to one or more embodiments described herein. In particular, FIG. 3A depicts a flow diagram of a method 300 for in-flight engine re-start of an aircraft engine according to one or more embodiments described herein. FIG. 3B depicts a flow diagram of a method 340 for performing a windmilling restart of an aircraft engine according to one or more embodiments described herein. FIG. 3C depicts a flow diagram of a method 360 for performing a starter assist restart of an aircraft engine according to one or more embodiments described herein. The method 300, the method 340, and/or the method 360 can be performed by the engine control 122 of FIG. 2 to restart the gas turbine engine 20 of FIG. 1, for example, and/or another suitable system or device. The methods 300, 340, 360 are now described together with reference to the components of FIGS. 1 and 2 but are not so limited.

At block 302, an aircraft having at least two engines (e.g., "engine 1" and "engine 2") is in the air (e.g., in flight) or at speed (e.g., the aircraft is in motion but is not airborne, such as when the aircraft is performing a take off or landing such that the aircraft is at speed but is still on the ground) and an engine switch for each of the at least two engines is in an "on" position.

At block 304, the engine control 122 determines whether engine 1 is running. If not, the method 300 advances to block 306 and ends.

If at block 304 it is determined that engine 1 is not running, the method 300 advances to block 308. At block 308, the engine control 122 determines whether the shutdown was pilot initiated. If so, the method 300 advances to block 306 and ends.

If at block 308 it is determined that the shutdown was not pilot initiated, the method 300 advances to block 310, where the engine control 122 issues an alert to the pilot that an auto-restart procedure is being implemented. The alert can be any suitable alert, such as an audio alert, a visual alert, a tactile alert, and/or the like, including combinations and/or multiples thereof.

At block 312, the engine control 122 sets a flag (e.g., a bit) to disable a switch for engine 2. This prevents/avoids a quick-relight scenario as described herein. That is, even if the pilot turns the switch for engine 2 by mistake in an attempt to restart engine 1, the switch for engine 2 is deactivated.

At block 314, the engine control 122 implements the auto-relight procedure. As described herein, the auto-relight procedure is an automatic function that schedules an "igniter ON" condition when the shutdown engine N2DOT is indicating a loss of energy.

At block 316, the engine control 122 determines whether the auto-relight procedure was successful at block 314. If so, the method 300 advances to block 318, where the flag is reset to enable the switch for engine 2.

If at block 316 it is determined that the auto-relight procedure was not successful at block 314, the method 300 proceeds, and the engine control 122 performs an auto-start procedure (e.g., windmilling restart and/or starter assist restart).

The method 300 advances to block 318 where the engine control 122 evaluates a current flight envelope. A flight envelope defines the operating limits of the aircraft and may change depending on, for example, the stage of flight of the aircraft. For example, a flight envelope during takeoff may differ from a flight envelope during cruise. At block 318, the engine control 122 determines whether to perform a windmilling restart (block 340) or a starter assist restart (block 360). For example, the engine control 122 may determine at block 322 to perform a windmilling restart when there is sufficient airspeed through a fan of the engine 20 to generate enough torque on the turbine to perform a relight. This may occur, for example, when the aircraft is moving at substantially 250 knots or more. As another example, the engine control 122 may determine at block 322 to perform a starter assist restart if the conditions for windmilling restart are not satisfied.

If it is determined at block 322 to perform a windmilling restart, the method 300 advances to block 340, which represents the method 340 shown in FIG. 3B. If it is determined at block 322 to perform a starter assist restart, the method 300 advances to block 360, which represents the method 360 shown in FIG. 3C. The methods 340, 360 are now described in more detail.

With reference to FIG. 3B, the method 340 provides for performing a windmilling restart of an aircraft engine. At block 342, the shutdown engine (e.g., engine 1 from the example above (see block 304) is left to stabilize.

At block 344, the engine control 122 alerts the pilot to the windmilling restart attempt, using any suitable alert, such as an audio alert, a visual alert, a tactile alert, and/or the like, including combinations and/or multiples thereof.

At block 346, the engine control 122 initializes and performs the windmilling restart.

At block 348, the engine control 122 determines whether the windmilling restart was successful at block 346. If the windmilling restart was successful, the method 340 proceeds to block 318, where the engine control 122 resets the flag to enable the switch for engine 2. The method 340 then ends at block 306.

If at block 348 it is determined that the windmill restart was not successful at block 346, the method 340 proceeds to block 350. At block 350, the engine control 122 alerts the pilot to enter a starter assist restart envelope. That is, the pilot is alerted to control the aircraft to cause the aircraft to follow a flight envelope suitable for performing starter assist restart. This may include controlling any suitable property of the aircraft, such as a speed, an altitude, an angle of attack, and/or the like, including combinations and/or multiples thereof. According to one or more embodiments described herein, the engine control 122 and/or another suitable device or controller automatically controls the aircraft to cause the aircraft to enter the starter assist restart envelope.

The method 340 then advances to block 360, which represents the method 360 shown in FIG. 3C, and starter assist restart begins. Particularly, with reference to FIG. 3C, the method 360 provides for performing a starter assist restart.

At block 362, the engine control 122 initiates and/or transmits a request to start an auxiliary power unit (APU) of the aircraft and to enable bleed air. The APU in this example represents the "starter" of the starter assist restart. Bleed air is compressed air used to restart the engine. In this case, bleed air is supplied by the APU to the shutdown engine (e.g., engine 1)

At block 364, the engine control 122 detects that the shutdown engine (e.g., engine 1) is stabilized and that the APU is started with bleed air on.

At block 366, the engine control 122 initiates and performs the starter assisted restart.

At block 368, the engine control 122 determines whether the starter assist restart was successful. If so, the method 360 proceeds to block 318, where the engine control 122 resets the flag to enable the switch for engine 2. The method 360 then ends at block 306.

If at block 368 it is determined that the starter assist restart was not successful at block 366, the method 360 proceeds to block 370. At block 370, the engine control 122 alerts the pilot that the engine restart was unsuccessful. The alert can be any suitable alert, such as an audio alert, a visual alert, a tactile alert, and/or the like, including combinations and/or multiples thereof. If the engine does not restart successfully, the flag to enable engine 2 switch needs to be reset upon the occurrence of landing of the aircraft (e.g. transitioning from flight to ground status). This transition can be indicated by the aircraft or computed by the engine control 122 (e.g., a FADEC). In such cases, the method 360 proceeds to block 318, where the engine control 122 resets the flag to enable the switch for engine 2. The method 360 then proceeds to block 306 and ends.

Additional processes also may be included, and it should be understood that the process depicted in FIGS. 3A-3C represents an illustration, and that other processes may be added or existing processes may be removed, modified, or rearranged without departing from the scope of the present disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for restarting an engine of an aircraft during a flight of the aircraft, the method comprising:
   detecting a shutdown of the engine;
   issuing an alert that an auto-restart procedure is being implemented;
   setting a flag to prevent a quick-relight situation, wherein the flag disables a switch used to shut down another engine of the aircraft;
   automatically performing an auto-relight procedure by a controller to attempt to restart the engine; and
   responsive to determining that the auto-relight procedure failed to restart the engine, selectively performing at least one of a windmilling restart of the engine or a starter assist restart of the engine.

2. The method of claim 1, further comprising, responsive to the windmilling restart failing to restart the engine, performing the starter assist restart of the engine.

3. The method of claim 2, wherein performing the starter assist restart of the engine comprises starting an auxiliary power unit and enabling bleed air from the auxiliary power unit to the engine.

4. The method of claim 1, further comprising, responsive to successfully restarting the engine using the auto-relight procedure, resetting the flag.

5. The method of claim 1, further comprising, responsive to successfully restarting the engine using the windmilling restart, resetting the flag.

6. The method of claim 1, further comprising, responsive to successfully restarting the engine using the starter assist restart, resetting the flag.

7. The method of claim 1, wherein selectively performing the at least one of the windmilling restart of the engine or the starter assist restart of the engine is based on a flight envelope of the aircraft.

8. The method of claim 1, wherein the engine is a gas turbine engine.

9. A controller comprising: a memory comprising computer readable instructions; and a processing device for executing the computer readable instructions, the computer readable instructions controlling the processing device to perform operations for restarting an engine of an aircraft during a flight of the aircraft, the operations comprising:
   detecting a shutdown of the engine;
   issuing an alert that an auto-restart procedure is being implemented;
   setting a flag to prevent a quick-relight situation, wherein the flag disables a switch used to shut down another engine of the aircraft;
   automatically performing an auto-relight procedure by a controller to attempt to restart the engine; and
   responsive to determining that the auto-relight procedure failed to restart the engine, selectively performing at least one of a windmilling restart of the engine or a starter assist restart of the engine.

10. The controller of claim 9, wherein the operations further comprise, responsive to the windmilling restart failing to restart the engine, performing the starter assist restart of the engine.

11. The controller of claim 10, wherein performing the starter assist restart of the engine comprises starting an auxiliary power unit and enabling bleed air from the auxiliary power unit to the engine.

12. The controller of claim 9, wherein the operations further comprise, responsive to successfully restarting the engine using the auto-relight procedure, resetting the flag.

13. The controller of claim 9, wherein the operations further comprise, responsive to successfully restarting the engine using the windmilling restart, resetting the flag.

14. The controller of claim 9, wherein the operations further comprise, responsive to successfully restarting the engine using the starter assist restart, resetting the flag.

15. The controller of claim 9, wherein selectively performing the at least one of the windmilling restart of the engine or the starter assist restart of the engine is based on a flight envelope of the aircraft.

16. The controller of claim 9, wherein the engine is a gas turbine engine.

17. A computer program product comprising a computer readable storage medium having program instructions embodied therewith, the program instructions executable by a processor to cause the processor to perform operations for restarting an engine of an aircraft during a flight of the aircraft, the operations comprising:
   detecting a shutdown of the engine;
   issuing an alert that an auto-restart procedure is being implemented;
   setting a flag to prevent a quick-relight situation, wherein the flag disables a switch used to shut down another engine of the aircraft;
   automatically performing an auto-relight procedure by a controller to attempt to restart the engine; and
   responsive to determining that the auto-relight procedure failed to restart the engine, selectively performing at least one of a windmilling restart of the engine or a starter assist restart of the engine.

18. The computer program product of claim 17, wherein the operations further comprise, responsive to the windmilling restart failing to restart the engine, performing the starter assist restart of the engine.

19. The computer program product of claim 18, wherein performing the starter assist restart of the engine comprises starting an auxiliary power unit and enabling bleed air from the auxiliary power unit to the engine.

20. The computer program product of claim 17, wherein the operations further comprise, responsive to successfully restarting the engine using the auto-relight procedure, resetting the flag.

* * * * *